(12) United States Patent
Duquesnois et al.

(10) Patent No.: US 6,452,515 B1
(45) Date of Patent: Sep. 17, 2002

(54) VIDEO ENCODER AND DECODER

(75) Inventors: Laurent Duquesnois, Limeil-Brevannes; Cécile Dufour; Lionel Bouchard, both of Paris, all of (FR); Ivo Jansch, Vlissingen (NL)

(73) Assignee: Koninklijke Philips Electronics, N.V. (NL)

( * ) Notice: Subject to any disclaimer, the term of this patent is extended or adjusted under 35 U.S.C. 154(b) by 0 days.

(21) Appl. No.: 09/548,112

(22) Filed: Apr. 12, 2000

(30) Foreign Application Priority Data

Apr. 16, 1999 (EP) .............................................. 99400938
Feb. 1, 2000 (EP) .............................................. 00400273

(51) Int. Cl.⁷ ................................................ H03H 7/00
(52) U.S. Cl. ............................ 341/50; 341/50; 463/31; 463/32; 463/9; 273/153 R; 273/157 R
(58) Field of Search ................................ 463/9; 382/232, 382/250; 358/15; 348/390; 707/500.1; 345/474, 680, 781, 422, 475, 302; 375/240.26, 240.01; 341/50; 711/171

(56) References Cited

U.S. PATENT DOCUMENTS

| | | | | |
|---|---|---|---|---|
| 5,220,410 A | * | 6/1993 | Wakeland et al. | 358/15 |
| 5,613,091 A | * | 3/1997 | Stone et al. | 711/171 |
| 5,643,084 A | * | 7/1997 | Mirsky | 463/9 |
| 5,679,075 A | * | 10/1997 | Forrest et al. | 463/9 |
| 5,721,543 A | * | 2/1998 | Johnson et al. | 341/50 |
| 5,727,141 A | * | 3/1998 | Hoddie et al. | 345/475 |
| 5,815,604 A | * | 9/1998 | Simons et al. | 382/250 |
| 5,828,369 A | * | 10/1998 | Foster | 345/302 |
| 6,064,771 A | * | 5/2000 | Migdal et al. | 382/232 |
| 6,088,061 A | * | 7/2000 | Katata et al. | 348/390 |

OTHER PUBLICATIONS

Johannes Kneip et al., Applying and Implementing the MPEG–4 Multimedia Standard, IEEE, 1999.*
Philippe Salembier, Segmentation–Based Video Coding System Allowing the Manipulation of Objects, IEEE, vol. 7, No. 1 Feb. 1997.*

(List continued on next page.)

*Primary Examiner*—Valencia Martin-Wallace
*Assistant Examiner*—Yveste Cherubin
(74) *Attorney, Agent, or Firm*—Edward W. Goodman

(57) ABSTRACT

A video encoder and decoder are provided for processing a sequence of animated pictures in such a way that an interactive game, such as a puzzle for instance, may be played. Each picture of a movie sequence is divided into a predetermined number of pieces that are then randomly coded (according to the MPEG-4 standard), transmitted and/or stored, decoded and displayed. It is then possible to play with the pieces to reorder them while they are in motion (with possible associated audio), according to predefined rules and ends of scenarios. The left and right buttons of a mouse, or a similar control device, are used to displace either one piece, or a group of attached pieces respectively, in order to verify if the proposed location for a piece is free and possible (no contradiction with any other surrounding piece) and then to drop said piece on the new spot, or, on the contrary, if some contradiction is detected, send back the piece (or, respectively, the group of attached pieces) to its previous location.

3 Claims, 9 Drawing Sheets

OTHER PUBLICATIONS

Regis Crinon, Sprite–Based Viedo Coding Using On–Line Segmentation, IEEE, Jun. 1998.*

Yong He, A Software–Based MPEG–4 Video Encoder Using Parallel Processin, IEEE, vol. 8, No. 7, Nov. 1998.*

Animation Central, Internet.*

Koenen, MPEG–4 Multimedial for our time, Feb. 1999, IEEE pp. 26–33.*

"Representing moving images with layers", by J.Y.A. Wang and E.H. Adelson, IEEE Transactions on Image Processing, vol. 3, No. 5, Sep. 1994, pp. 625–638.

"Overview of the MPEG–4 Version 1 Standard" (document ISO/IEC/ JTC1/SC29/WG11 N1909, Oct. 1997, Fribourg, Switzerland).

* cited by examiner

VIDEO ENCODER AND DECODER

BACKGROUND OF THE INVENTION

1. Field of the Invention

The present invention relates to a video encoder for processing sequences of animated pictures, such as movies, and to a corresponding decoder.

2. Description of the Related Art

The MPEG-4 International Standard, described, for instance, in "Overview of the MPEG-4 Version 1 Standard" (document ISO/IEC JTC1/SC29/WG11 N1909, October 1997, Fribourg, Switzerland), is an object-based standard for multimedia. This means that the MPEG-4 standard is not only able to encode video pictures, as usually considered on a television screen, but it can also handle video data including shapes and textures within these shapes. The MPEG-4 video standard is, therefore, said to deal with YUVA input signals, YUV corresponding to the luminance and chrominance components, and A corresponding to what is called the A channel, or alpha channel.

An illustration of an YUVA object as encountered in the MPEG-4 standard is given in FIGS. 1 and 2, where FIG. 1 shows a colored picture corresponding to YUV signals and FIG. 2 shows only a shape, a contour between a black area and a white one. It is known, for instance, from the document "Representing moving images with layers", by J. Y. A Wang and E. H. Adelson, IEEE Transactions on Image Processing, vol. 3, n°5, September 1994, pp.625–638, that an alpha map -or an alpha plane- allows to define the transparency, or the opacity, of a region at each of its points, i.e., the shape of this region considered as transparent, while the remaining part is considered as masked, or obscured. The alpha plane may also be coded with 8 bits, which then allows a more precise information on the level of opacity or transparency of the object.

This functionality of dealing with YUVA signals gives the possibility to process each object of a picture in an autonomous way. The main application of said possibility is to implement a flexible management of the structure of video or audio-visual scenes, and of the composition of the elementary streams corresponding to said scenes, and more particularly, to compose scenes where data from different types can be managed independently.

SUMMARY OF THE INVENTION

It is an object of the invention to propose a new type of application of this functionality.

To this end, the invention relates to a video encoder provided for processing a sequence of animated pictures, such as a movie, said encoder comprising:

means for dividing a screen window occupied by said sequence into X rows and Y columns;

means for separately encoding each one of the X·Y parts of each picture of the sequence thus obtained;

means for associating, to each of said parts a specific label indicating its position in the window, and encoding these labels in a random order.

The invention also relates to a corresponding video decoder provided for decoding input signals coded by means of this encoder, said decoder comprising:

means for decoding said encoded parts and said coded associated labels;

means for displaying the decoded parts thus obtained in a random order, while storing the decoded associated labels.

Said decoder preferably comprises post-processing means for displacing and reordering the displayed parts in the original correct order.

It is another object of the invention to implement a decoder in which said post(processing means comprises sets of computer-readable instructions allowing to play a puzzle and corresponding to the implementation of the following events:

displacement of a single displayed decoded piece of said puzzle from any location to any other one or to one of the X·Y places available in a screen window corresponding to the reordered sequence of pictures;

displacement of a displayed decoded piece and all attached displayed decoded pieces from any location to any other one or to one of the X·Y places available in said window.

Preferably, said:displacements are controlled by means of a mouse or a similar control device, with the following sequence of events "LEFT BUTTON DOWN", "MOUSE MOVE", "LEFT BUTTON UP" for the displacement of any single piece, and with the following sequence of events "RIGHT BUTTON DOWN", "MOUSE MOVE", "RIGHT BUTTON UP" for the displacement of any specific piece and all attached pieces.

BRIEF DESCRIPTION OF THE DRAWINGS

The invention will now be described in a more detailed manner, with reference to the accompanying drawings in which.

DESCRIPTION OF THE PREFERRED EMBODIMENTS

Figure 1:
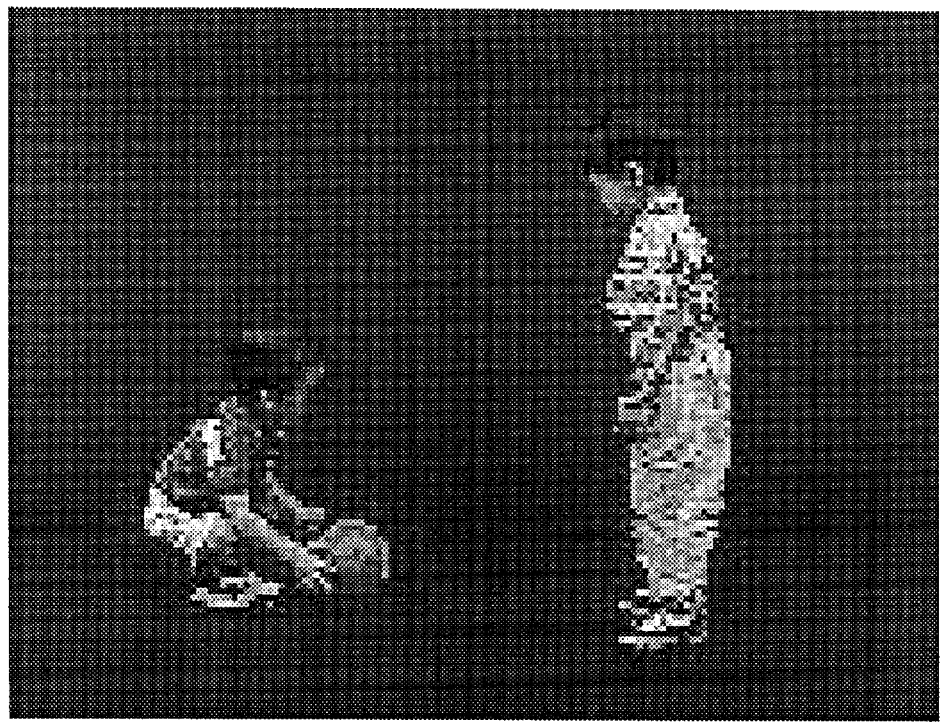
FIG. 1 shows a colored picture corresponding to YUV signals.
Figure 2:
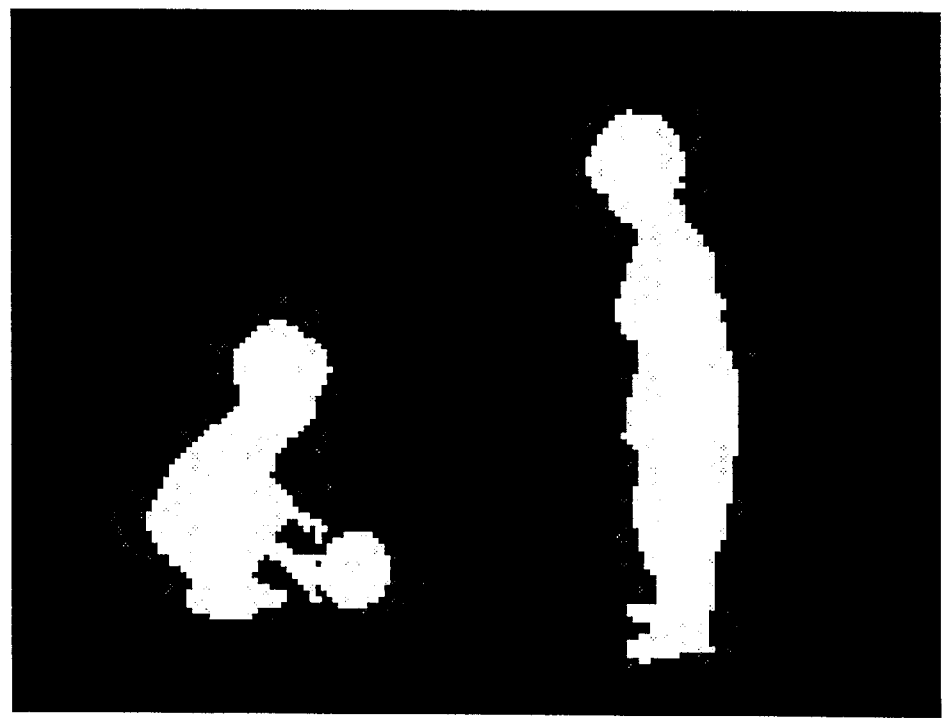
FIG. 2 the corresponding black and white shape for the A channel (alpha channel)
Figure 3:
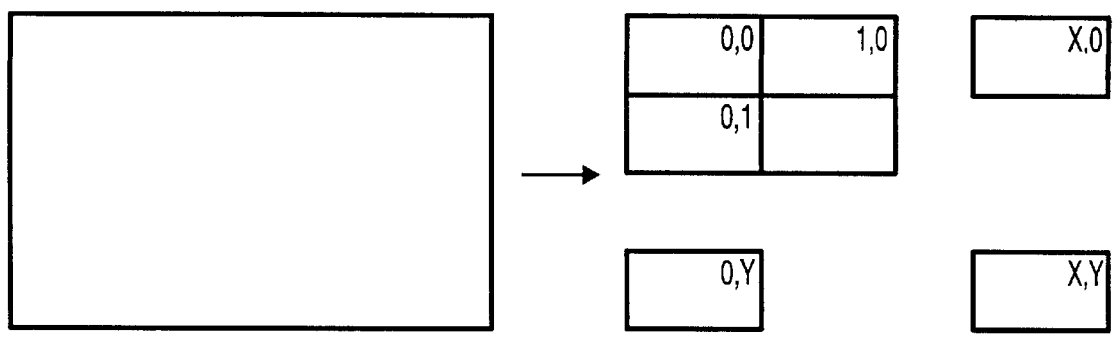
FIG. 3 illustrates the principle of the sub-division of a movie sequence into X.Y parts to which a bidimensional label is associated.

According to the invention, a sequence of animated pictures, for instance, a movie sequence, is processed as now explained. The movie sequence is divided into P rows and Q columns, as illustrated in FIG. 3, and each part of the movie is separately encoded according to the MPEG-4 standard (i.e., is processed as an autonomous object) while storing simultaneously, a bidimensional label [a, b] indicating the original position of the concerned part in the movie sequence (a varies from 0 to X and b from 0 to Y; therefore, P=X+1 and Q=Y+1).

The encoded parts of the movie sequence are then, in a random order, either transmitted (real-time transmission) or locally stored, on a disk or on a separate server. At the receiving side, the MPEG-4 visual objects, separately encoded and transmitted (or stored), which correspond to the original P×Q parts of the movie sequences, are received and decoded. The interest of this separate coding, transmission and decoding is then to recreate the original movie on P·Q independent screen windows, which may lead to several specific a applications. For instance, P·Q distinct screens can display independently, a part of the movie, for survey applications, for example, or for attributing parts of the movie to separate viewers.

Another application may be the creation of an interactive game for a final user. The MPEG-4 visual objects, which represent the different parts of the original movie sequence, may be restituted and displayed in a random order: on the screen, the MPEG-4 scene plays all parts of the movie at the same time, but not in the right order for the user.

The goal of the game is then, by an appropriate control action of the user on the parts, to reorder them to recreate the movie sequence in its original aspect. To obtain this result, the viewer can use a mouse to click on a specific part and drag it to the place where he thinks the part should go. A comparison of the original label (also coded and transmitted, or stored) with the label of said place may be provided for the information of the user.

Different rules may be chosen for the displacement of the displayed, decoded parts. One way of displacing them is disallowing the parts to overlap: the user can then only move a part from a given place to a neighboring empty place. A different rule may allow the user to drag a part to any place he wants to go, like when playing a puzzle. It is then necessary to allow overlapping of the parts. Whatever the rule, during the dragging of the parts, playback of the sequence continues, and even the part that is currently being dragged is constantly in motion.

Figure 4:
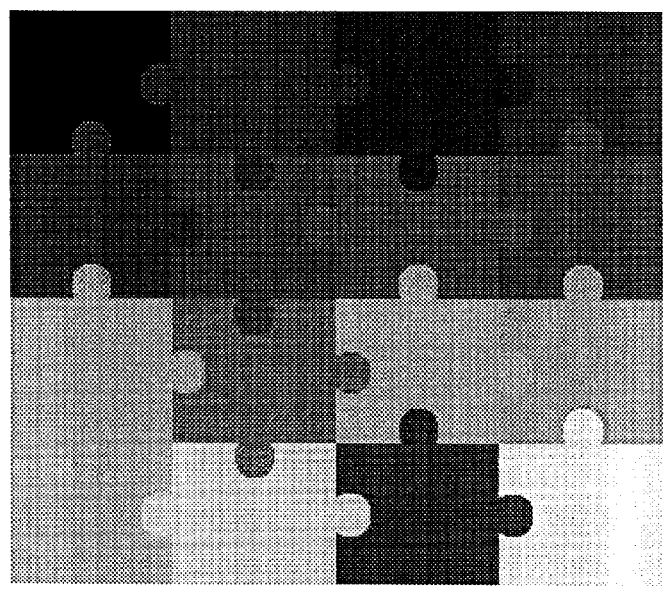
FIG. 4 shows a picture divided into 16 puzzle pieces.
Figure 5:
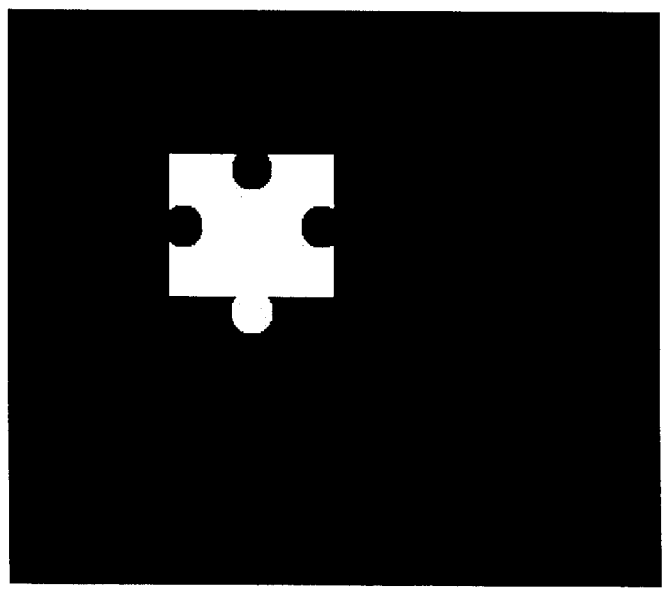
FIG. 5 the alpha channel input signal corresponding, for instance, to the 6th piece.

A further application of said encoding process may be, therefore, the realization of an MPEG-4 puzzle of M×N pieces, for example, of a very simple puzzle of 4×4 parts in the particular embodiment now described with reference to FIG. 4, illustrating a rectangle picture sub-divided into 16 arbitrarily shaped pieces (shown with different grey levels), and FIG. 5 showing the alpha input signal of the 6th piece (in black and white). This embodiment requires 16 alpha channels input signals (M×N in the general case), each of them corresponding to one piece of the puzzle.

Once each alpha signal corresponding to each piece has been built, 16 MPEG-4 video object encoding operations are run (for the run i of video object encoding, with i ranging between 1 and 16, the following input files are: one YUV input file corresponding to the conventional video signal, and the alpha file corresponding to the piece i). These 16 runs lead to the creation of 16 bitstreams, and the decoding of one single bitstream corresponds to one specific piece.

Figure 6:
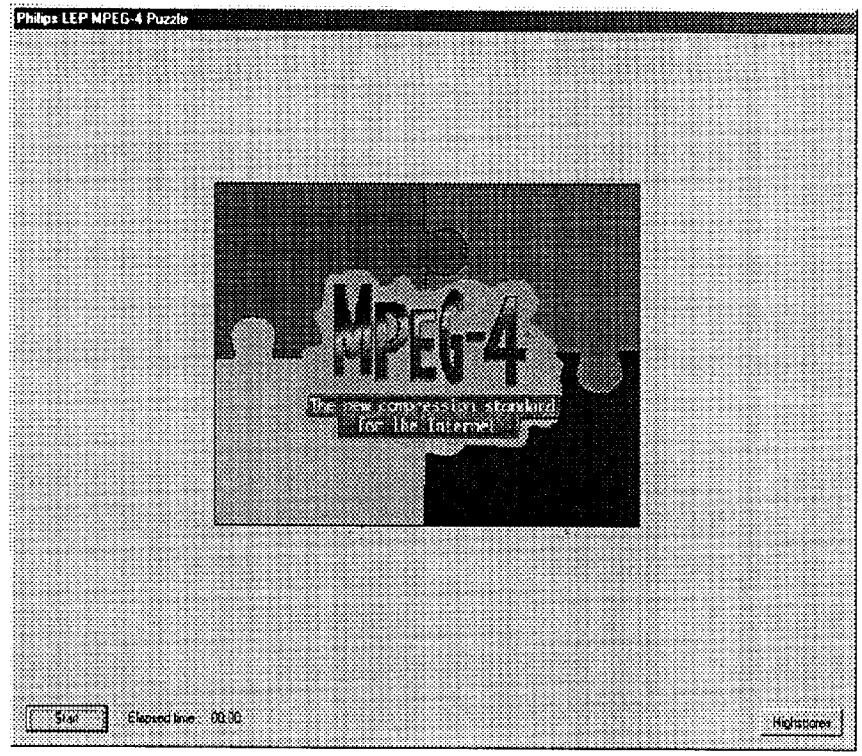
FIG. 6 is an example of the picture displayed on the screen window at the beginning of the operations when playing with an MPEG-4 scene for reordering the pieces of a puzzle prepared with this scene.
Figure 7:
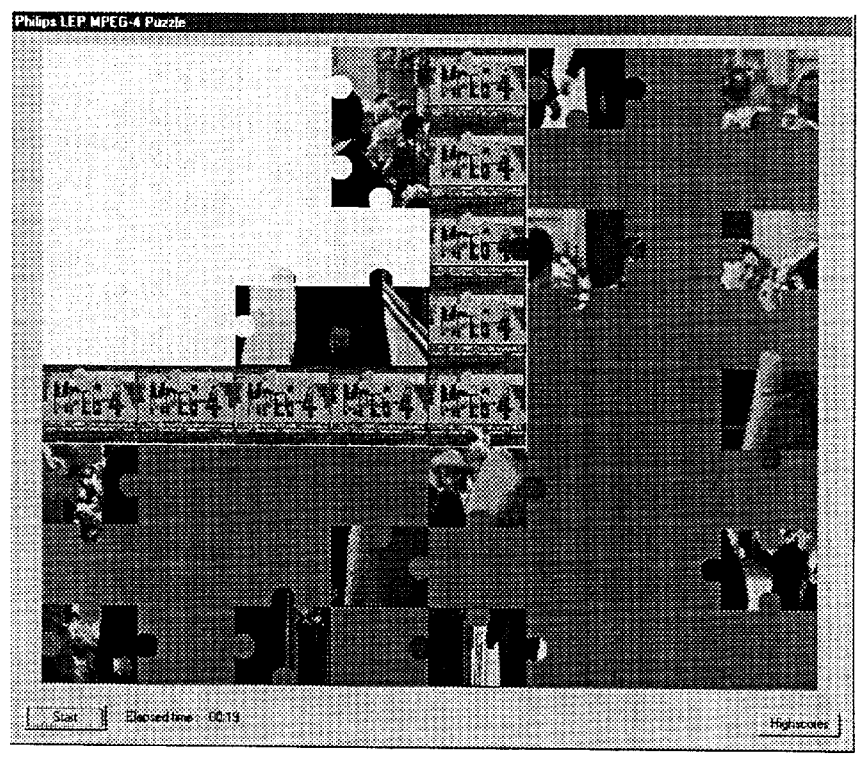
FIG. 7 shows how the puzzle workspace is organized.

The successive sub-steps of the decoding and displaying step will now be explained, with reference to FIGS. 6 to 17. The start-up panel, that can be seen on the display screen, may be, for instance, as illustrated in FIG. 6, and the puzzle workspace as shown in FIG. 7. In said puzzle workspace, a part P1 of the screen window is attributed to the frame of the puzzle to be reconstructed, and the remaining part P2 to the separate pieces of the puzzle, displayed and shown in a random order.

Figure 8:
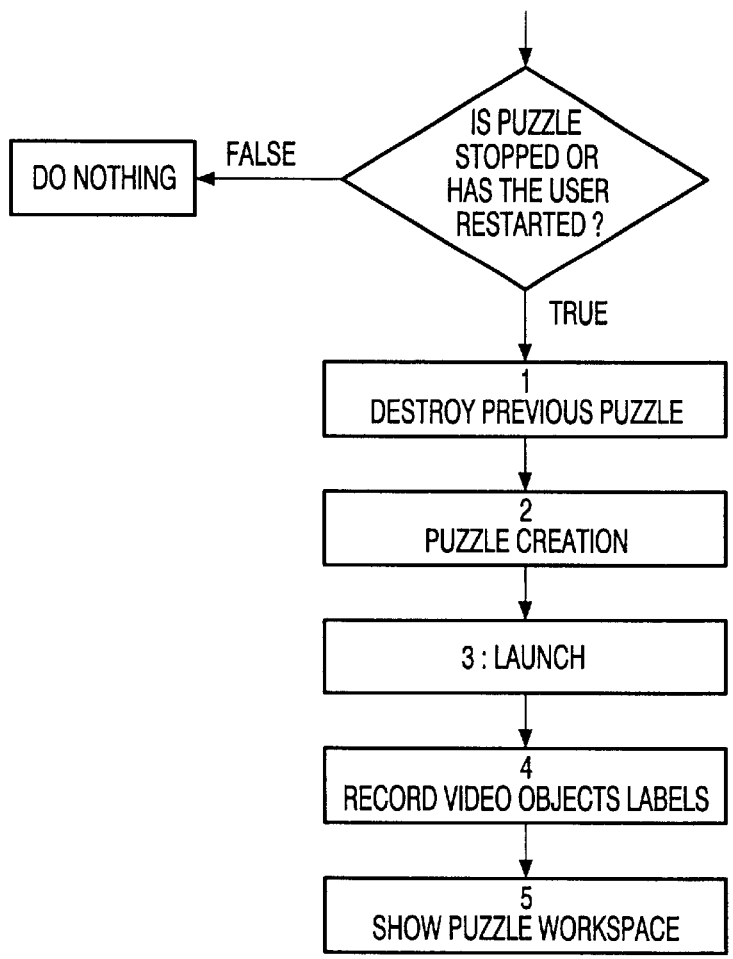
FIGS. 8 to 17 illustrate the main operations implemented when playing the puzzle in the workspace of FIG. 7.

The decoding process is illustrated in FIG. 8 and comprises the main following operations:

(a) initialization (by action of the user in the window "start" of the screen window of FIG. 6 or FIG. 7): in case of a first start, the puzzle part P1, which was stopped, is obviously empty, but in case of a restart, all previous allocated data corresponding to puzzle pieces already in their right place will have be destroyed, which is done with this first operation (step 1: destroy previous puzzle).

(b) puzzle creation: the puzzle object is created and the corresponding initializations are launched;

(c) the user launches the puzzle (step 3), and an accompanying audio sequence may be added, a scheduling stage being provided in order to manage and synchronize all the things to do during the implementation of the process;

(d) the fourth operation corresponds to the acquisition of the puzzle piece identifiers (IDs) and their recording according to their localization (4: record video object labels), in order to have a reference to decide later whether the puzzle is solved or not;

(e) the puzzle workspace is displayed, i.e., the 16 pieces, the background , . . . (5: show puzzle workspace)

Figure 9:
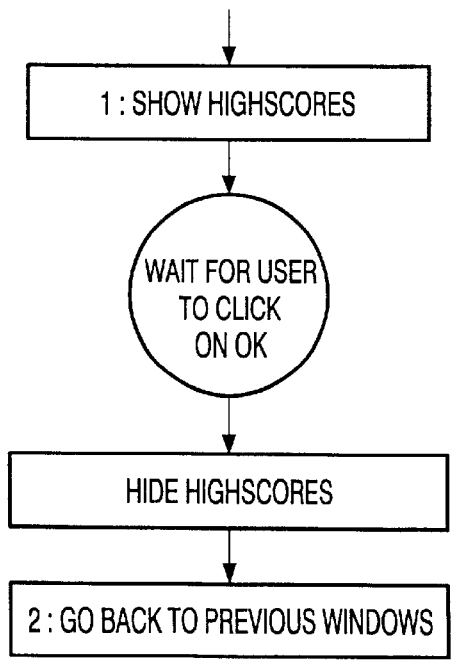

When playing for reordering the puzzle pieces, additional operations may be actuated, for example, the "highscore event" command depicted in FIG. 9. The sub-step 1 of said operation shows highscores, i.e., it is provided for displaying the highscore panel containing, for instance, a maximum of ten scores (with names and associated information). Once said highscore panel has been displayed, and if the user has clicked on OK, the highscores which have been shown are now hidden, and one goes back (sub-step 2) to the previous window. The operation "highscore event" can be called either from the start-up panel (FIG. 6) or from the workspace panel (FIG. 7).

Figure 10:
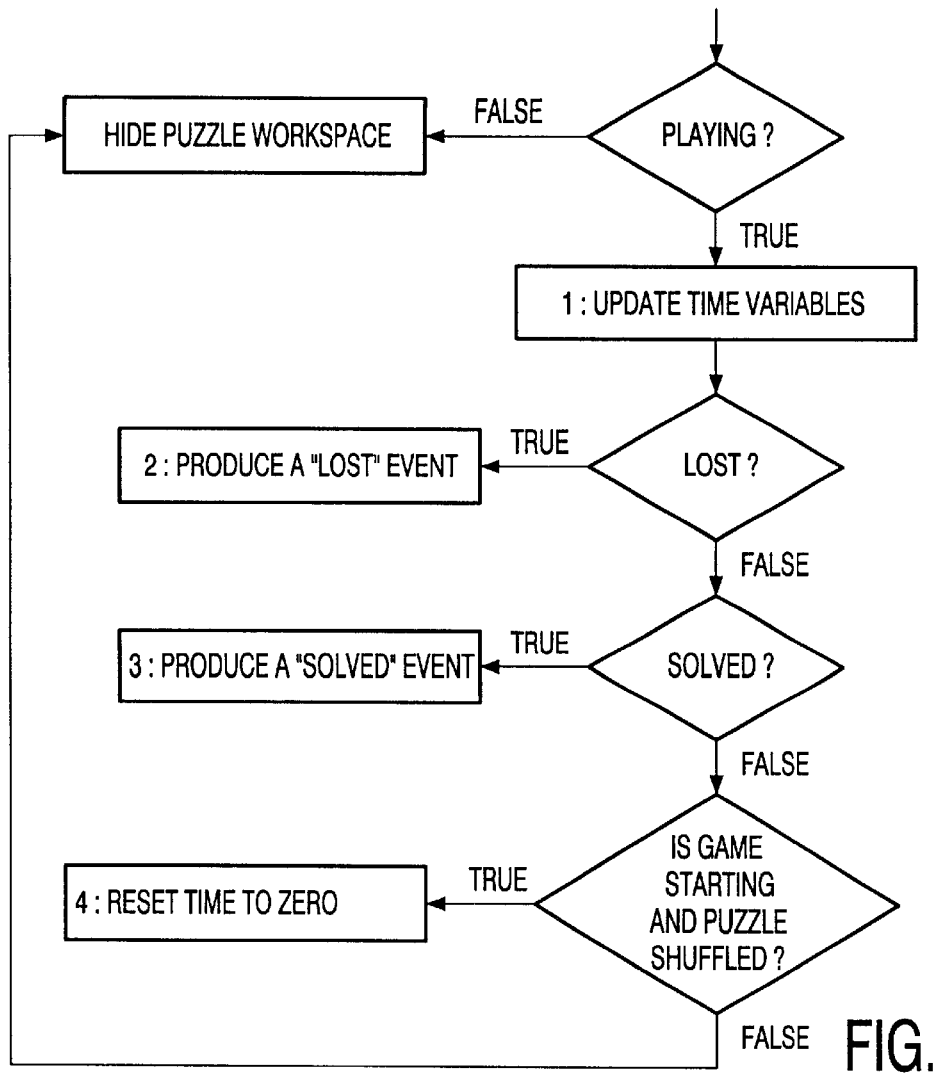

Moreover, each time a second is elapsed, a timer event is automatically triggered, according to the flowchart of FIG. 10, in which a first test is carried out for verifying if a user is playing ("PLAYING ? "). If not (result "FALSE" of the test), the puzzle workspace is hidden. If yes (result "TRUE" of the test), a sub-step 1 takes place for updating time variables (this sub-step corresponds to an incrementation by one of the number of elapsed seconds and eventually of the number of elapsed minutes), and some tests are then performed:

"GAME LOST ?": if yes, a procedure corresponding to the event "LOST" is called (sub-step 2), and if not, the following test is performed ("PUZZLE SOLVED ?");—"PUZZLE SOLVED ?": if yes, a procedure corresponding to the event "SOLVED" is called (sub-step 3), and if not, the following test is performed ("GAME STARTING ?");

"GAME STARTING?": if yes, all the time variables (sub-step 4) are reset to zero (moreover the game can really start or re-start only if the puzzle pieces are shuffled), and if not, the puzzle workspace is hidden.

Figure 11:
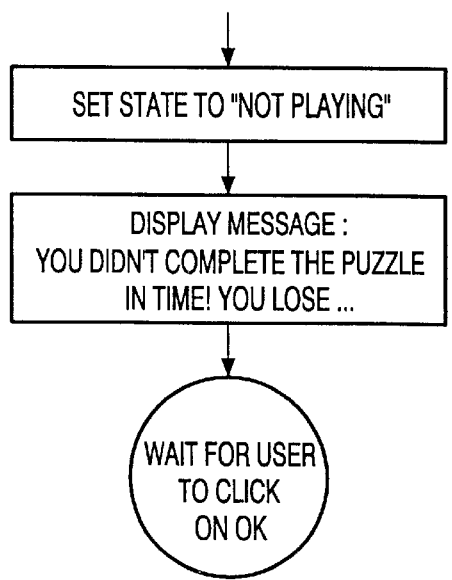
Figure 12:
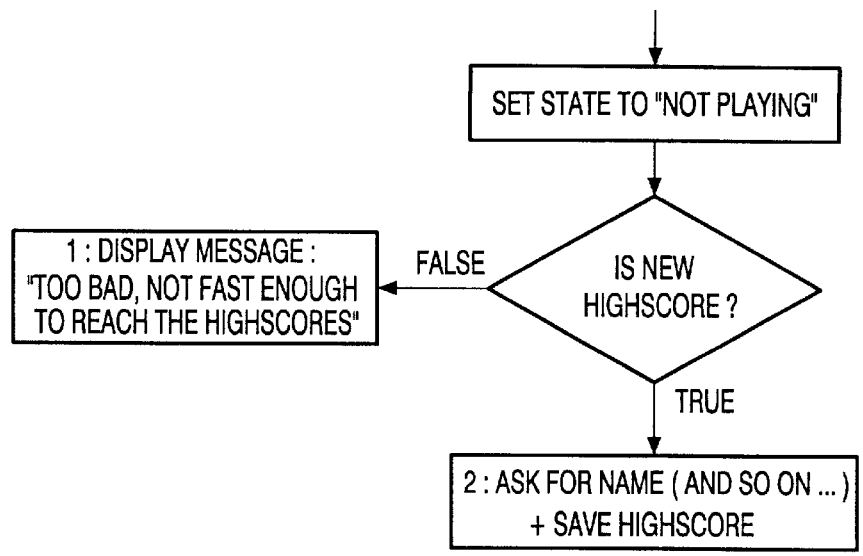

The event "LOST" is illustrated in FIG. 11. The state of the decoder is set to "NOT PLAYING". The user has not succeeded in solving the puzzle (for instance, before the end of the video sequence or the occurrence of any other predefined event). A corresponding message is then displayed, for instance, "you didn't complete the puzzle in time ! you lose. . . ", and the device waits until the user has clicked on "OK". The event "SOLVED" is illustrated in FIG. 12. As previously for the event "LOST", the state of the decoder is set to "NOT PLAYING". Two situations may then occur: either the user solved the puzzle but did not succeed in reaching the highscores, or he succeeded. To this test "NEW HIGHSCORE ?", there are two replies: no (result "FALSE"), and (sub-step 1) a message is then displayed (for instance "Too bad, not fast enough to reach the highscores"), or yes (result "TRUE"), and (sub-step 2) the score is saved in the same time as the name (and other possible information) of the user.

Before these results are obtained, a mouse (or any similar control device also allowing to click as with a mouse on a piece and to displace it) is used for playing with the pieces of the puzzle, for instance according to the following control events "MOUSE MOVE", "LEFT BUTTON DOWN", "LEFT BUTTON UP", "RIGHT BUTTON DOWN", and "RIGHT BUTTON UP", which will be successively explained.

Figure 13:
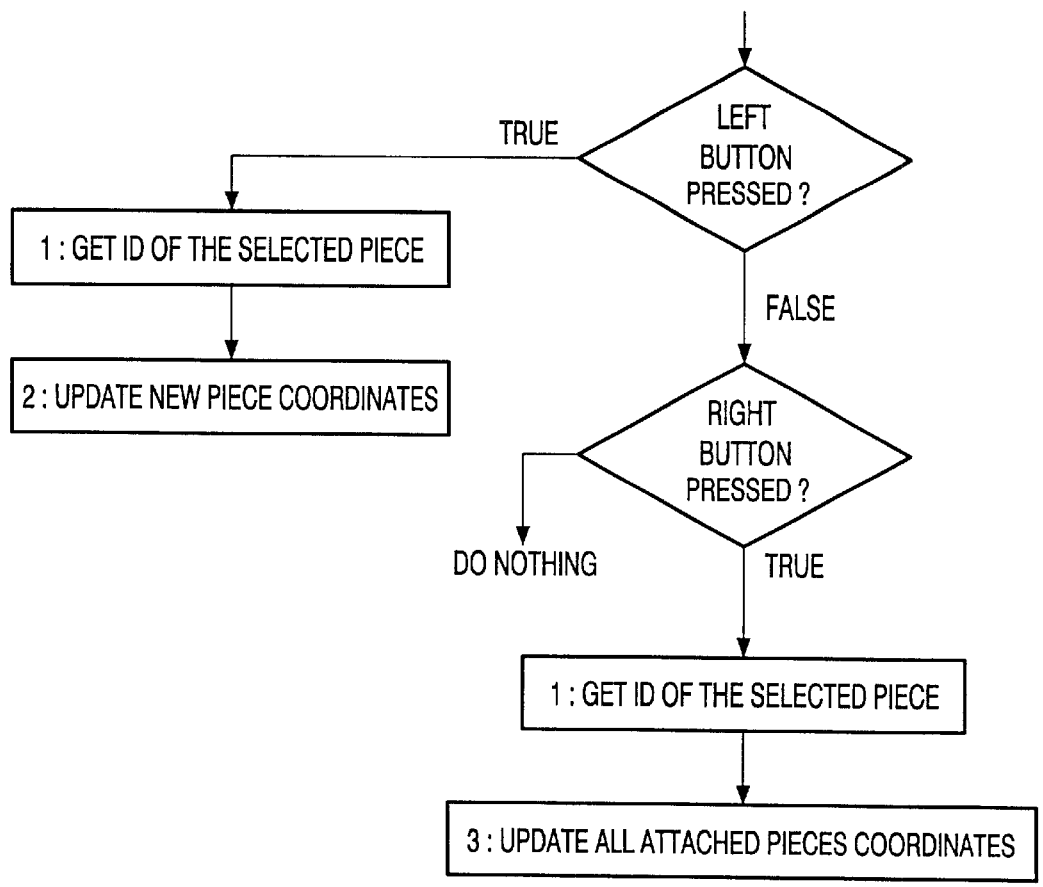

The event "MOUSE MOVE", illustrated in FIG. 13, comprises the following main sub-steps: a first test "LEFT BUTTON PRESSED ?", followed by a second test "RIGHT BUTTON PRESSED ?". If the left button of the mouse has been pressed (or if an equivalent function of the similar control device has been actuated), the selected puzzle piece ID (as seen above, ID=identifier) is retrieved (operation 1: get ID of the selected piece) and the new coordinates—after the mouse displacement—are applied to this current piece (operation 2: update new piece coordinates). If the first button has not been pressed, but the second one (right button) has been pressed (or if the equivalent function of the similar control device has been actuated), the selected puzzle piece ID is retrieved (as previously, operation 1: get ID of the selected piece), but the new coordinates are now applied to the current piece and all its attached ones (operation 3: update all attached pieces coordinates), since it is indeed often useful, when playing a puzzle, to displace a lot of pieces already put together.

Figure 14:
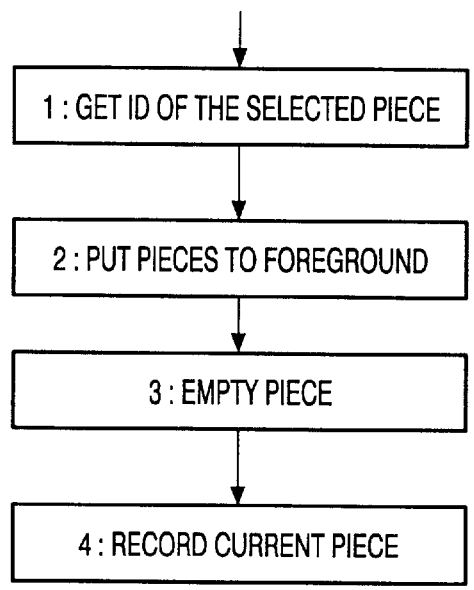

The event "LEFT BUTTON DOWN", illustrated in FIG. 14, comprises the following sub-steps. If this event occurs, then:
  the selected piece ID is retrieved (1: get ID of the selected piece),
  given the selected piece ID, the picture depth is managed so as to place said piece on the top of all others (2: put piece to foreground);
  a localization table is updated (3: empty piece location), since the selected piece has been displaced and is no longer at its previous place, which becomes empty;
  the localization coordinates of the piece are stored (4: record current piece location), since they might be used if the new location is not allowed (in this case, the piece will be sent back to its previous location).

Figure 15:
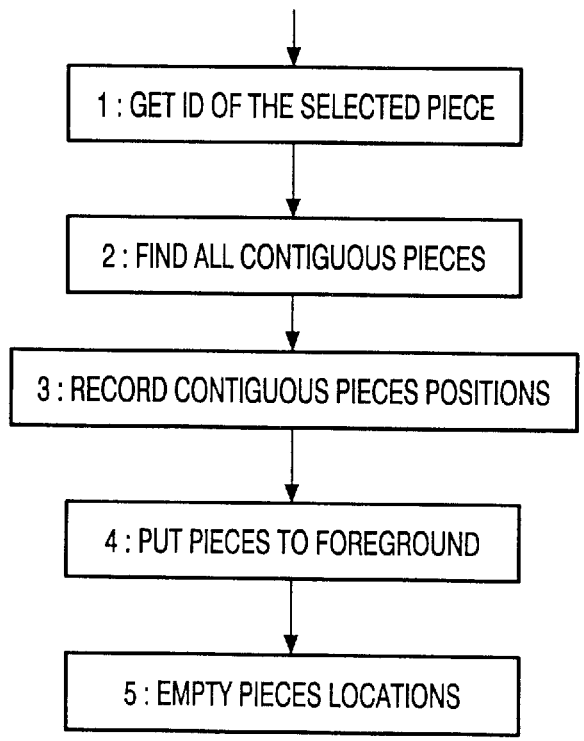

The similar event "RIGHT BUTTON DOWN", illustrated in FIG. 15, comprises the following steps:
  the selected piece is retrieved (1: get ID of the selected piece)
  all attached pieces IDs are acquired, in order to be able to move, as a single block, a group of pieces (2: find all contiguous pieces);
  the localization coordinates of these contiguous attached pieces are stored (3: record contiguous pieces positions), since they might be used if the new location is not allowed (in this case, the pieces will be sent back to their previous locations);
  given these selected pieces, their depth is managed so that the group of pieces now selected is displayed on the top of all others (4: put pieces to foreground);
  the localization table entries corresponding to all the selected pieces IDs are emplied (5: empty pieces locations).

Figure 16:
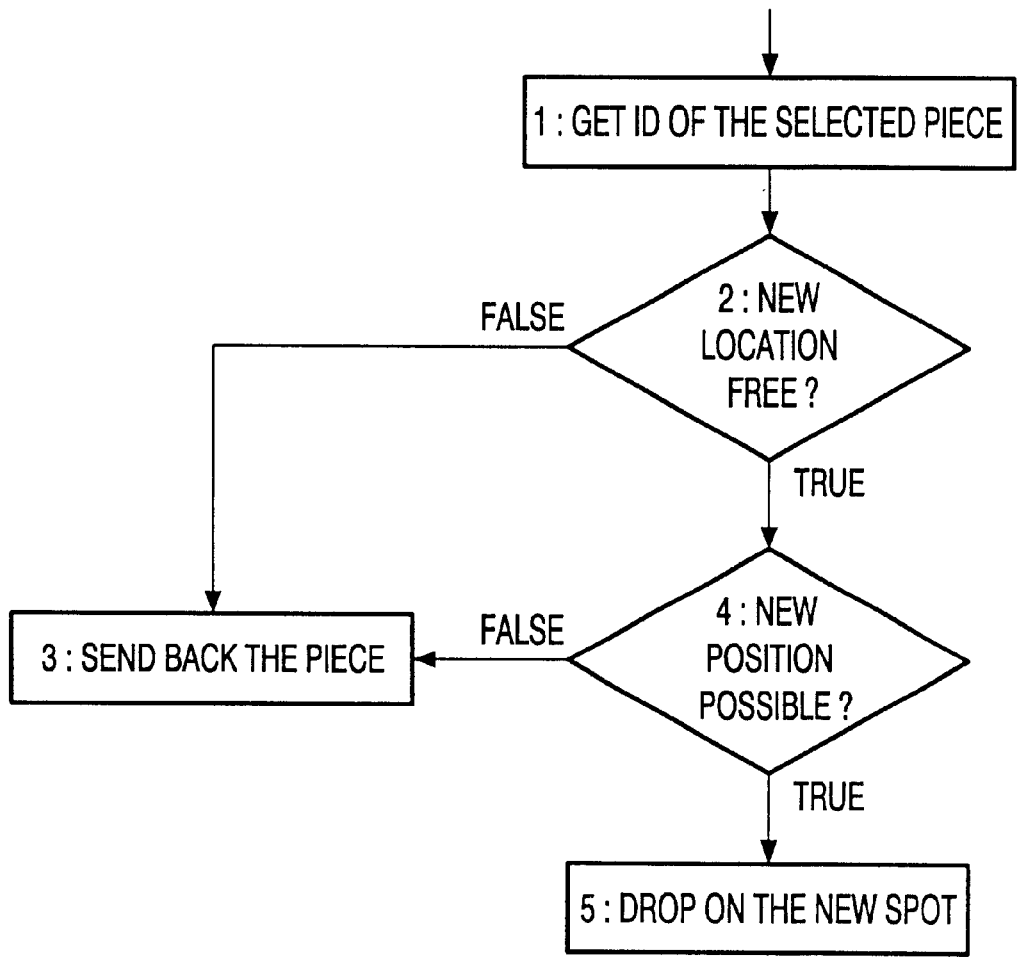

The event "LEFT BUTTON UP", illustrated in FIG. 16, comprises the following steps:
  the selected piece ID is retrieved (1: get ID of the selected piece)
  a test is carried out (2: new location free ?) in order to check if the new location is not already occupied;
  if this new location is not accepted (already occupied), the piece is sent back to the place where it came from (3: send back the piece), thanks to the coordinates recorded during the event "LEFT BUTTON DOWN";
  if the new location is accepted, a test is carried out (4: new position possible ?) in order to verify that the new piece is not in contradiction with some other surrounding piece(s) (in such a case, the new piece is sent back to the place where it came from (3: send back the piece);
  if there is no contradiction, the new location is accepted, the piece is placed to its new location, and the localization table is updated (5: drop on the new spot).

Figure 17:
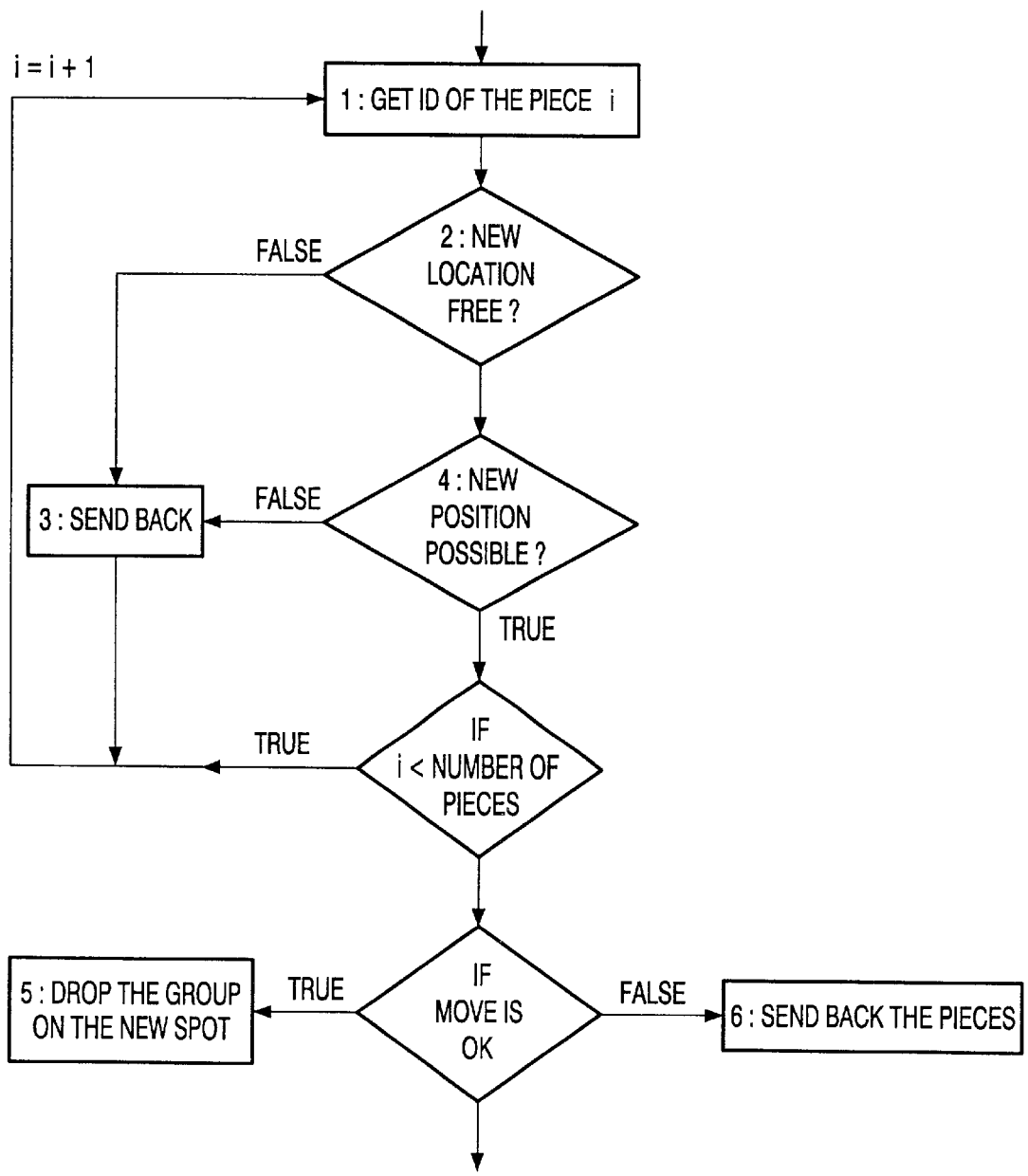

The similar event "RIGHT BUTTON UP", illustrated in FIG. 17, comprises the following steps, carried out for each of the I pieces that are attached to form a single group (it is necessary to verify that no piece of the group is in contradiction with any surrounding piece already in place):
  the selected piece ID is retrieved (1: get ID of the piece n°i, within the group of attached pieces, with i=1 to I);
  a test is carried out (2: new location free ?) in order to check if the new location is not already occupied;
  if this new location is not accepted (already occupied), the piece is sent back, with the attached ones, to the place where they came from( 3: send back the pieces);
  if the new location is accepted, a test is carried out (4: new position possible ?) in order to verify that the new piece is not in contradiction with some other surrounding piece(s) (in such a case, i.e., when "MOVE-IS-NOT-OK", the new piece is sent back, with the attached ones, to the place where they came from (3: send back the pieces);
  if there is no contradiction, the new location is accepted ("MOVE-IS-OK"), the pieces are placed in the new location, and the localization table is updated (5: drop the group on the new spot).

It must be noted that these events are generally coupled, according to the following sequences: "LEFT BUTTON DOWN"/"MOUSE MOVE"/"LEFT BUTTON UP", or "RIGHT BUTTON DOWN"/"MOUSE MOVE"/"RIGHT BUTTON UP". They have been described separately only for a better clarity.

It must also be noted that the mouse (or the similar control device) is free to move from any point of the screen ; in the described application, it is, however, not free to stop at any place, since the locations to be occupied by the puzzle pieces are discrete ones, corresponding to the number of pieces, but only at one of the X·Y or M·N locations clearly designated (by the user) by the zone where the piece is arrived after the event "MOUSE MOVE".

It must still be noted that the puzzle is usually reconstituted within the main window (part P1 of FIG. 7), but it may be decided to carry out an assembling operation of at least some pieces also in the workspace P2 surrounding P1, and therefore to implement in said part P2 the needed tests to verify that there is no contradiction between these pieces.

As already indicated in relation with FIGS. 14 to 17, there are several possible ending scenarios. According to the first one, the user was not able to complete the puzzle before the end of the movie: the user lost the game. If the user was able to complete the puzzle but the time he needed was longer than a predetermined deadline (or than the time needed by a given number of users that completed the puzzle before him), the user won the puzzle; however, he did not get a highscore. If the user was able to complete the puzzle faster than at least one of said users that completed the puzzle before him, he won the puzzle. He may then enter his name (and possible other information) in the highscore list. Finally, it may also be decided not to limit the time to complete the puzzle, the game being then lost only when the user gives up.

What is claimed is:

1. A video encoder for processing a sequence of animated pictures, said encoder comprising:

means for dividing a screen window occupied by said sequence into X rows and Y columns;

means for separately encoding each one of the X·Y parts of each picture of the sequence thus obtained; and means for associating, to each of said parts, a specific label indicating a position of the part in the window, and for encoding these labels in a random order.

2. A video decoder for decoding input signals previously coded by the video encoder as claimed in claim 1, said decoder comprising:

means for decoding said encoded parts and said coded associated labels; and means for displaying the decoded parts in a random order, while storing the decoded associated labels.

3. The decoder as claimed in claim 2, wherein the decoder further comprises post-processing means for displacing and reordering the displayed parts in an original correct order.

* * * * *